United States Patent Office 3,632,766
Patented Jan. 4, 1972

3,632,766
PHARMACEUTICAL PREPARATIONS CONTAINING SUBSTITUTED PHENYLCARBAMIC ACID ESTERS OF CYCLIC AMINO ALCOHOLS
Johan Richard Dahlbom, Sodertalje, and John Lars Gunnar Nilsson, Skarholmen, Sweden, assignors to Aktiebolaget Astra, Sodertalje, Sweden
No Drawing. Original application Feb. 28, 1968, Ser. No. 708,758, now Patent No. 3,544,579, dated Dec. 1, 1970. Divided and this application Aug. 17, 1970, Ser. No. 64,616
Claims priority, application Sweden, Mar. 9, 1967, 3,307/67
Int. Cl. A61k 27/00
U.S. Cl. 424—267  5 Claims

ABSTRACT OF THE DISCLOSURE

Pharmaceutical preparations containing carbamates which are substituted phenylcarbamic acid esters of N-alkyl-substituted cyclic amino alcohols of the general formula:

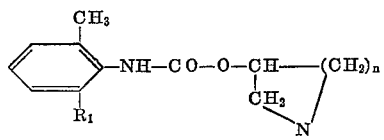

These preparations exhibit local anesthetic effects.

---

This is a division of application Ser. No. 708,758, filed Feb. 28, 1968 now U.S. Pat. No. 3,544,579.

The present invention relates to pharmaceutical preparations containing carbamate compounds as active ingredients. More particularly, this invention relates to carbamate compounds which are substituted phenylcarbamic acid esters of cyclic amino alcohols of the general formula:

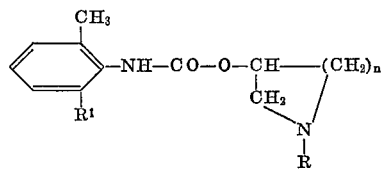

wherein R is a lower alkyl group, $R^1$ is selected from the class consisting of hydrogen, lower alkyl and halogen and $n$ is an integer from 2 to 3 and therapeutically acceptable acid addition salts thereof. The alkyl groups contain at most 5 carbon atoms and may be straight or branched.

These carbamate compounds are stable and possess valuable pharmacological properties, especially local anesthetic properties.

These new compounds may be prepared in a number of different ways which may be summarized by the following reaction formula:

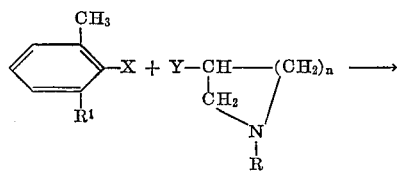

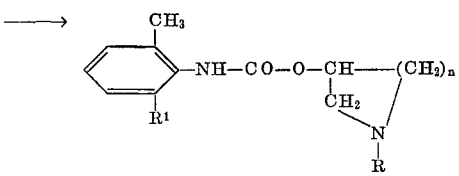

wherein R, $R^1$ and $n$ have the meaning given above and wherein X and Y are groups capable of reacting with each other to the formation of the bridge —NH—CO—O— between the two rings.

Examples of different ways of carrying out the present invention are:

(1) Reaction between an isocyanate of the formula,

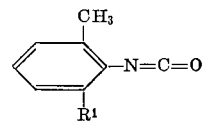

and an alcohol of the formula,

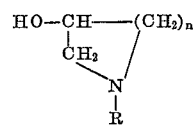

(2) Transesterification of an ester of the formula,

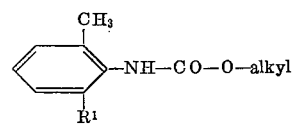

with said alcohol.

(3) Reaction between an acid azide of the formula,

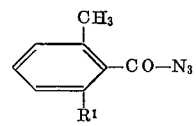

and said alcohol.

(4) Reaction between a carbamic acid chloride of the formula,

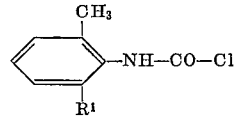

and said alcohol.

(5) Reaction between an amine of the formula,

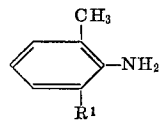

and a chlorocarbonic acid ester of the formula,

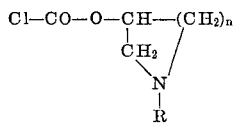

When used as local anesthetics in therapy, the compounds according to the present invention may be administered in the form of a sterile, injectable solution of at least one of these compounds in a pharmaceutical carrier. The concentration is not important and widely varying concentrations are therapeutically effective. Typically, solutions may contain from about 0.02% up to a high of about 10% active ingredient by weight. The compounds may also be administered in the form of other pharmaceutical preparations, such as suspensions, jellies, ointments or bases.

In pharmaceutical preparations, one or more of the compounds according to the invention may be used in the form of their free bases or therapeutically acceptable acid addition salts or as both. The expression therapeutically acceptable acid addition salt is recognized in the art to designate an acid addition salt which is physiologically innocuous when administered in a dosage and at an interval (i.e. frequency of administration) that is effective for the indicated therapeutic use of the parent compound. Typical therapeutically acceptable acid addition salts of the compounds of the present invention include, but are not limited to, the salts of mineral acids, such as hydrochloric, hydrobromic, phosphoric or sulphuric acid; organic acids, such as acetic, glycolic, lactic, levulinic acid, acetic, fumaric, maleic, succinic, tartaric, benzoic and cinnamic acids; and sulphonic acids, such as methane sulphonic and sulphamic acid.

As is well known in the art, solutions of local anesthetics may be made isotonic by the addition of sodium chloride. Furthermore, it is known in the art of local anesthesia that anesthetic effectiveness may be improved by addition of a vasoconstrictor, such as adrenaline, noradrenaline or octapressin.

The amount of local anesthetic which may be used varies widely and is well known depending upon the location and type of anesthesia required. The anesthetic effect, according to the present invention, is induced by applying an amount of a substituted phenylcarbamic acid ester of cyclic amino alcohols of the present invention which is effective to produce the desired anesthesia. Repeated applications at therapeutically effective intervals may be made, if desired, to obtain a prolonged anesthetic effect.

The valuable pharmacological properties of the carbamate compounds of the present invention are demonstrated in Table 1, wherein the local anesthetic effects of a number of these carbamates is given in comparison with lidocaine, a well-known local anesthetic. The relative effect of lidocaine equals 1.0.

TABLE 1

| | | | Local anesthetic effect | | |
|---|---|---|---|---|---|
| $R^1$ | R | $n$ | Blocking of conduction in isolated frog nerve | Surface anesthetic effect on rabbit cornea | Toxicity in mice, i.v. $LD_{50}$, mg./kg. |
| Cl | $C_2H_5$ | 2 | 1–1.5 | 4.1 | 21 |
| $CH_3$ | $C_3H_7$-n | 2 | 2 | 3.6 | 17 |
| Cl | $C_3H_7$-n | 2 | 1.5–2 | 4.5 | 14 |
| $CH_3$ | $C_3H_7$-i | 2 | 1.5 | 2.8 | 22 |
| Cl | $C_3H_7$-i | 2 | 1.5–2 | 5.0 | 14 |
| $CH_3$ | $C_4H_9$-t | 2 | 1.5 | 10.0 | 12 |
| Cl | $C_4H_9$-t | 2 | 1.5–2 | 4.9 | 10 |
| $CH_3$ | $CH_3$ | 3 | 1–1.5 | 3.0 | 15 |
| Cl | $CH_3$ | 3 | 4–4.5 | 4.0 | 14 |
| H | $C_2H_5$ | 3 | 0.7 | 1.0 | 34 |
| $CH_3$ | $C_2H_5$ | 3 | 1.5–2 | 2.8 | 14 |
| Cl | $C_2H_5$ | 3 | 4–4.5 | 6.7 | 14 |
| $CH_3$ | $C_3H_7$-n | 3 | 1.5–2 | 3.2 | 9 |
| Cl | $C_3H_7$-n | 3 | 4–4.5 | 4.8 | 12 |
| $CH_3$ | $C_3H_7$-i | 3 | 1.5–2 | 3.2 | 13 |
| Cl | $C_3H_7$-i | 3 | 4–4.5 | 4.8 | 11 |
| $CH_3$ | $C_4H_9$-t | 3 | 3.5–4 | 5.1 | 7 |
| Cl | $C_4H_9$-t | 3 | 3.5–4 | 6.2 | 5 |
| $CH_3$ | $C_4H_9$-n | 3 | 2 | 2.9 | 10 |
| Cl | $C_4H_9$-n | 3 | 2 | 4.7 | 13 |

Table 2 shows the results of a number of experiments with guinea pigs comparing the local anesthetic effects of two compounds according to the present invention with lidocaine and bupivacaine, another known anesthetic which is used chemically as a long-acting local anesthetic agent.

TABLE 2.—LOCAL ANESTHETIC EFFECTS

| Compound | | | Sciatic nerve block [a] | | Block of the plexus brachialis [b] | | Peridural anesthesia [c] | | | Peridural anesthesia [d] | | |
|---|---|---|---|---|---|---|---|---|---|---|---|---|
| | | | | | | | | Duration, min. | | | Duration, min. | |
| $R^1$ | R | $n$ | Conc., percent | Duration, min. | Conc., percent | Duration, min. | Conc., percent | Hind-limb paralysis | Segmental analgesia | Conc., percent | Deep motor block | Block of support of weight |
| Cl | $C_4H_9$-n | 3 | 0.5 / 1.0 | 142±14 / 228±14 | 0.75 | 215±23 | 0.75 | 123±5 | 94±5 | 0.5 / 1.0 | 225±32 / 410±15 | 170±32 / 338±18 |
| $CH_3$ | $C_4H_9$-n | 3 | 0.5 / 1.0 | 139±9 / 178±9 | 0.75 | 186±19 | 0.75 | 120±5 | 79±11 | Not studied | | |
| Bupivacaine | | | 0.5 | 144±14 | 0.75 | 132±7 | 0.5 | 91±6 | 62±8 | 0.5 | 218±15 | 143±14 |
| Lidocaine | | | 2.0 | 80±7 | 2.0 | 51±7 | 2.0 | 41±2 | 37±3 | 2.0 | 110±6 | 88±6 |

[a] Guinea-pig. Hind-limb paralysis. Injected volume, 0.2 ml. N=8.
[b] Guinea-pig. Fore-limb paralysis. Solutions with adrenaline 1:200000. Injected volume, 0.2 ml. N=8.
[c] Guinea-pig. Solutions containing adrenaline 1:200000. Injected volume, 0.1 ml. N=16.
[d] Cat. Solutions containing adrenaline 1:100000. Injected volume, 1.5 ml. N=10.

NOTE.—N=Number of animals.

In Table 3, the results of comparative tests with frogs, mice and guinea pigs to show local anesthetic effects and acute toxicity using lidocaine and two compounds according to the invention are reported:

The following compounds may be prepared in an analogous way:

N-ethyl-3-pyrrolidyl 2,6-dimethylphenylcarbamate: M.P. 57–58.5° C.

TABLE 3.—LOCAL ANESTHETIC EFFECTS AND ACUTE TOXICITY

| Compound | | Isolated nerve of the frog [a] | Sciatic nerve block [b] | Peridural anesthesia [c] | Intravenous $LD_{50}$, mg./kg.[d] (base) |
|---|---|---|---|---|---|
| Lidocaine | 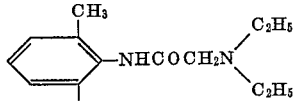 | 1.0 | 1.0 | 1.0 | 22 |
| HS 37 (I) | 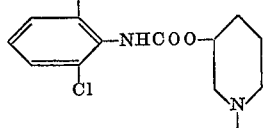 | >>1 | 2.7 | 3.1 | 13 |
| HS 38 (II) | 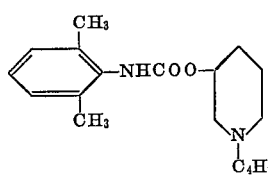 | >>1 | 2.3 | 3.3 | 10 |

[a] 5 mM solutions. Incubation time, 5 min. N=3.
[b] Guinea-pig. 1.0% solutions. Injected volume 0.2 ml. N=8.
[c] Guinea-pig. 1.0% solutions with adrenaline 1:200000. Injected volume, 0.1 ml. N=8.
[d] Mice. N=50–70.

Note. N=Number of animals.

The acceptable toxicity levels of the present invention are demonstrated in Table 4. Table 4 reports the results of further comparative experiments on the acute toxicity of bupivacaine and two compounds of the present invention using mice, guinea pigs and rats.

TABLE 4.—ACUTE TOXICITY $(LD)_{50}$ IN MICE, GUINEA-PIGS AND RATS

| Compound | | | $LD_{50}$[a] mg./kg. [base] | | | |
|---|---|---|---|---|---|---|
| $R^1$ | R | n | Intravenous, mice | Intraperitoneal, guinea-pigs | Subcutaneous Mice | Rats |
| Cl | $C_4H_9$-n | 3 | 12.8 (11.5–13.6) | 62.4 (54.2–71.6) | 56.3 (47.6–66.4) | 86.3 (80.5–92.4) |
| $CH_3$ | $C_4H_9$-n | 3 | 10.6 (9.9–11.3) | 60.0 (53.4–66.6) | 64.9 (57.0–72.8) | (1) |
| Bupivacaine | | | 7.1 (5.3–9.6) | 36.6 (28.2–47.6) | 35.0 (31.4–39.3) | 47.0 (41.2–53.5) |

[1] Not studied.

[a] Calculated according to Litchfield and Wilcoxon (J. Pharmacol. 96, 99 1949). 95 percent confidence intervals (in brackets).

The following examples show methods for preparing the compounds according to the present invention and procedures for making various pharmaceutical preparations containing these compounds as active ingredients.

EXAMPLE 1

Preparation of N-t-butyl-3-pyrrolidyl 2-chloro-6-methylphenylcarbamate 4.65 g. of 2-chloro-6-methylphenylisocyanate were added to a solution of 4 g. N-t-butyl-3-hydroxypyrrolidine in 75 ml. of dry toluene and the solution was refluxed for 2 hours. After cooling the solution was washed twice with 25 ml. portions of water and extracted twice with 25 ml. portions of 2 M hydrochloric acid. The acid extract was made alkaline with soda solution and the precipitated base was extracted with chloroform. After evaporation of solvent in vacuo, the crystalline residue was purified by recrystallization from ligroin. The pure product, N-t-butyl-3-pyrrolidyl 2-chloro-6-methylphenylcarbamate, melts at 108–109° C.

N-ethyl-3-pyrrolidyl 2-chloro-6-methylphenylcarbamate; M.P. 54–56° C.
N-n-propyl-3-pyrrolidyl 2,6-dimethylphenylcarbamate; M.P. 77–79° C.
N-n-propyl-3-pyrrolidyl 2-chloro-6-methylphenylcarbamate; M.P. 71–72° C.
N-i-propyl-3-pyrrolidyl 2,6-dimethylphenylcarbamate; M.P. 57–58.5° C.
N-i-propyl-3-pyrrolidyl 2-chloro-6-methylphenylcarbamate; M.P. 80–82° C.
N-t-butyl-3-pyrrolidyl 2,6-dimethylphenylcarbamate; M.P. of the hydrochloride 207–208° C.
N-methyl-3-piperidyl 2,6-dimethylphenylcarbamate; M.P. 101–102° C.
N-methyl-3-piperidyl 2-chloro-6-methylphenylcarbamate; M.P. 120–121° C.
N-ethyl-3-piperidyl 2-methylphenylcarbamate; M.P. of the hydrochloride 245–246° C.
N-ethyl-3-piperidyl 2,6-dimethylphenylcarbamate; M.P. 83–83.5° C.
N-ethyl-3-piperidyl 2-chloro-6-methylcarbamate; M.P. 83–84° C.
N-n-propyl-3-piperidyl 2,6-dimethylphenylcarbamate; M.P. 75–76° C.

N-n-propyl-3-piperidyl 2-chloro-6-methylphenyl-
carbamate; M.P. 100–101° C.
N-i-propyl-3-piperidyl 2,6-dimethylphenylcarbamate;
M.P. of the hydrochloride 209–210° C.
N-i-propyl-3-piperidyl 2-chloro-6-methylphenylcarbamate;
M.P. of the hydrochloride 207–208° C.
N-t-butyl-3-piperidyl 2,6-dimethylphenylcarbamate;
M.P. 110–111° C.
N-t-butyl-3-piperidyl 2-chloro-6-methylphenylcarbamate;
M.P. of the hydrochloride 219–220° C.
N-n-butyl-3-piperidyl 2-chloro-6-methylphenylcarbamate;
M. P. 76.5–77.5° C.
N-n-butyl-3-piperidyl 2,6-dimethylphenylcarbamate;
M.P. of the hydrochloride 122–124° C.

EXAMPLE 2

Preparation of N-methyl-3-piperidyl 2-chloro-6-
methylphenylcarbamate 0.2 g. of sodium were added to a solution of 12.7 g. of ethyl-2-chloro-6-methylphenylcarbamate and 11.6 g. of N-methyl-3-hydroxypiperidine in 100 ml. of toluene and the reaction mixture was refluxed for 8 hours during which ethanol formed and was slowly distilled off. The solution was then washed with water and extracted with 1 N hydrochloric acid. The extract was made alkaline with sodium carbonate and the oily reaction product thereby precipitated was extracted with ether. On evaporation of the ether, N-methyl-3-piperidyl 2-chloro-6-methylphenylcarbamate was obtained in crystalline form. After recrystallization from a mixture of ethanol and petroleum ether, the product melts at 120–121° C.

EXAMPLE 3

Preparation of N-methyl-3-piperidyl 2-methyl-
phenylcarbamate

A solution of 6.0 g. of o-tolyl azide and 6.5 g. of N-methyl-3-hydroxypiperidine in 50 ml. of dry benzene was refluxed for 2 hours. The solution was then washed twice with 50 ml. of water in order to remove excess amino alcohol and extracted with 2× 50 ml. of 2 N HCl. The acid extract was made alkaline with sodium carbonate solution and then extracted with chloroform. After drying over sodium sulphate, the chloroform was evaporated in vacuum. The residue, a slowly crystallizing oil, was purified by recrystallization from ligroin. The pure product, N-methyl-3-piperidyl 2-methylphenylcarbamate, melts at 92–93° C.

EXAMPLE 4

Preparation of N-ethyl-3-piperidyl 2,6-dimethyl-
phenylcarbamate 4.9 g. of 2,6-dimethylaniline and 3.2 g. of pyridine were added while chilling in ice to a solution of 4.0 g. of phosgene in 100 ml. of toluene. The reaction mixture was kept at 0° C. for 5 hours, whereafter 150 ml. of cold 2 M hydrochloric acid were added. The toluene phase was separated off and dried over calcium chloride. To the solution of 2,6-dimethylcarbamic acid chloride obtained was added 7.8 g. of N-ethyl-3-hydroxypiperidine and the solution was refluxed for 2 hours. After cooling the toluene solution was worked up as described in Example 1. The product, N-ethyl-3-piperidyl 2,6-dimethylphenylcarbamate, was purified by recrystallization from ligroin and melts at 83–83.5° C.

EXAMPLE 5

Preparation of N-n-propyl-3-piperidyl 2,6-dimethyl-
phenylcarbamate 2.8 g. of phosgene was added while chilling with ice to a solution of 4 g. of N-n-propyl-3-hydroxypiperidine in 100 ml. of chloroform. The reaction mixture was left at 0–5° C. while stirring, whereafter 3.4 g. of 2,6-dimethylaniline and 6 g. of triethylamine were added to the solution obtained containing the hydrochloride of N-n-propyl-3-hydroxypiperidine chlorocarbonic acid ester. The solution was refluxed for 4 hours, whereafter the solvent was distilled off. The residue was dissolved in water and the water solution was made alkaline with sodium carbonate solution. The base precipitated, N-n-propyl-3-piperidyl 2,6-dimethylphenylcarbamate, was extracted with ether. The ether solution was washed with water in order to remove triethylamine and dried over sodium sulphate. After evaporation of the solvent the residue was purified by recrystallization from petroleum ether. M.P. 75–76° C.

EXAMPLE 6

Injectable solution containing N-n-butyl-3-piperidyl-2-
chloro-6-methylphenylcarbamate hydrochloride To 100 ml. of hot, sterilized water, 0.1 g. of methyl p-hydroxybenzoate were added while stirring and heating. When all benzoate was dissolved, 2 g. of N-n-butyl-3-piperidyl - 2 - chloro - 6 - methylphenylcarbamate hydrochloride and 0.9 g. of sodium chloride were added while stirring. The pH was adjusted to 5.5 by adding sodium hydroxide. Sterilized water was added to 100 ml.

EXAMPLE 7

Injectable solution containing N-n-butyl-3-piperidyl-2-
chloro-6-methylphenylcarbamate hydrochloride and
vasoconstrictor To 100 ml. of hot, sterilized water, 0.1 g. of methyl p-hyroxybenzoate, 2 g. of N-n-butyl-3-piperidyl-2-cholor-6-methylphenylcarbamate hydrochloride and 0.9 g. of sodium chloride were added in the same way as described in Example 6, but the solution was protected from air-oxygen by working in nitrogen atmosphere. 0.05 g. of sodium pyrosulphite were then dissolved, whereafter 1 mg. of adrenaline was added. The pH was adjusted to 4.0 by adding sodium hydroxide. Sterilized water was added to 100 ml.

EXAMPLE 8

Pharmaceutical jelly containing N-n-butyl-3-piperidyl-2-
chloro-6-methylphenylcarbamate hydrochloride To 80 ml. of distilled water, 4 g. of N-n-butyl-3-piperidyl-2-chloro-6-methylphenylcarbamate hydrochloride were added. To this solution 4 g. of methylcellulose were added while stirring and when all methylcellulose was dissovled a solution of 50 mg. of chlorhexidine diglyconate in 10 ml. of water was added and the volume was adjusted to 100 ml. by addition of distilled water.

EXAMPLE 9

Pharmaceutical ointment containing N - n - butyl-3-
piperidyl-2-chloro-6-methylphenylcarbamate Equal amounts (27 g. of each) of polyethyleneglycol 300 and polyethyleneglycol 1540 were melted together with 19 g. of polyethyleneglycol 3000 at 60° C. Then 25 g. of propyleneglycol and finally 2 g. N-n-butyl-3-piperidyl-2-chloro-6-methylphenylcarbamate base were added and the ointment was homogenized.

EXAMPLE 10

Eye drop preparation containing N-n-butyl-3-piperidyl
2-chloro-6-methylphenylcarbamate hydrochloride To 100 ml. of distilled water are added 2 g. of N-n-butyl-3-piperidyl 2-chloro-6-methylphenylcarbamate hydrochloride. To this solution 0.5 g. of methylcellulose are added while stirring. When all methylcellulose was dissolved 2 mg. of benzalkonium chloride were added. The solution was filtered through a cotton filter, filled into vial and autoclaved.

EXAMPLE 11

Mouth gargle preparation containing N - n - butyl - 3-
piperidyl 2 - chloro - 6 - methylphenylcarbamate hydrochloride 5 g. of N-n-butyl-3-piperidyl 2-chloro-6-methylphenyl-carbamate hydrochloride and 1.0 g. methyl-p-oxibenzoate were dissolved in 1000 ml. distilled water. 0.2 g. of peppermint oil, 1.5 g. of Tween 80® and 20.0 g. of glycerine were added. The solution was filtered and filled into bottles.

EXAMPLE 12

Suppository preparations containing N - n - butyl - 3-piperidyl 2-chloro-6-methylphenylcarbamate base N-n-butyl-3-piperidyl 2 - chloro-6-methylphenylcarbamate base 30 mg.; hydrocortinsone acetate 5 mg.; zinc oxide 0.4 g.; witep sol W 25 to 2.25 g.

Material for 200 suppositories was used. The suppository base was melted at 50–55° C. and the N-n-butyl-3-piperidyl-2-chloro - 6 - methylphenylcarbamate base dissolved. The powders were added and the mixture was stirred, homogenized and filled into molds.

EXAMPLE 13

Aerosol spray containing N-n-butyl-3-piperidyl 2-chloro-6-methylphenylcarbamate base N-n-butyl-3-piperidyl 2 - chloro-6-methylphenylcarbamate base 4.1 g.; cetylpyridine chloride 0.008 g.; ethanol 7.8 ml.; polyethylene glycol 400 18.3 ml.; flavor q.s.

The N - n - butyl-3-piperidyl-2-chloro-6-methylphenyl-carbamate base was dissolved in the mixture of ethanol and polyethylene glycol. The other components were dissolved. 32.2 g. of the solution was filled into aerosol bottles. 32.5 g. of trichlorofluormethane and 17.5 g. of dichlordifluormethane were added and the bottles were capped with valves giving 50 mg. of N-n-butyl-3-piperidyl-2-chloro-6-methylphenylcarbamate in each dose.

We claim:

1. An anesthetic pharmaceutical preparation containing an effective anesthetic amount of a compound selected from the group consisting of carbamate of the general formula:

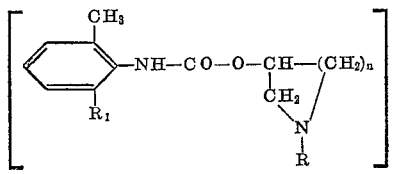

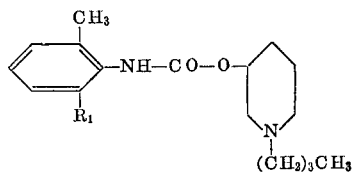

and therapeutically aceptable acid addition salt thereof, wherein $R_1$ is chlorine or methyl in association with a pharmaceutical carrier.

2. An anesthetic pharameutical preparation according to claim 1 wherein $R_1$ is methyl.

3. An anesthetic pharmaceutical preparation according to claim 1 wherein $R_1$ is chlorine.

4. An anesthetic pharmaceutical preparation according to claim 1 wherein the compound is dissolved in a sterile, injectable solution.

5. An anesthetic pharmaceutical preparation according to claim 4 wherein the sterile, injectable solution contains from about 0.02% to about 10% active ingredient.

References Cited

UNITED STATES PATENTS

| | | | |
|---|---|---|---|
| 2,762,842 | 9/1956 | Hafliger et al. | 260—553 |
| 3,103,515 | 9/1963 | Zaugg et al. | 260—292 |

FOREIGN PATENTS

| | | | |
|---|---|---|---|
| 717,212 | 10/1954 | Great Britain | 260—294.3 |
| 717,213 | 10/1954 | Great Britain | 260—294.3 |
| 717,214 | 10/1954 | Great Britain | 260—294.3 |
| 770,129 | 3/1957 | Great Britain | 260—294.3 |
| 772,807 | 4/1957 | Great Britain | 260—294.3 |
| 576,421 | 5/1959 | Canada | 260—294.3 |

OTHER REFERENCES

Dahlbom et al.: Acta Chem. Scand. 11, 1350–4 (1957).
Hutton et al.: J. Org. Chem. 20, 808–12 (1955).
Sekeva et al.: Experienta, 11, 275–6 (1955).
Sekeva et al.: Arch. Pharm. 291, 122–5 (1958).

JEROME D. GOLDBERG, Primary Examiner

U.S. Cl. X.R.

424—274

UNITED STATES PATENT OFFICE
CERTIFICATE OF CORRECTION

Patent No. 3,632,766          Dated April 10, 1972

Inventor(s) Johan Richard Dahlbom, John Lars Gunnar Nilsson

It is certified that error appears in the above-identified patent and that said Letters Patent are hereby corrected as shown below:

Col. 4, line 26, Change "5.0" to -- 4.0 --.
Col. 4, lines 27, 31-35, "n, i, t" should be italicized.
Col. 7, line 59, Change "was" to -- were --.
Col. 7, line 71, Change "N-n" to -- N-$\underline{n}$ --.
Col. 7, line 75, Change "N-n" to -- N-$\underline{n}$ --.

Col. 9, line 38, Change " of carbamate" to -- of a carbamate --.
Col. 10, line 10, Change "aceptable" to -- acceptable --.
Col. 10, line 11, Change "$R_1$" to -- $R^1$ --.

References cited--other references:
      Change "Experienta" to -- Experientia --.

Signed and sealed this 8th day of August 1972.

(SEAL)
Attest:

EDWARD M. FLETCHER, JR.      ROBERT GOTTSCHALK
Attesting Officer              Commissioner of Patents